United States Patent [19]
Umemoto

[11] Patent Number: 4,750,580
[45] Date of Patent: Jun. 14, 1988

[54] TRANSMISSION FOR WORKING VEHICLE HAVING OVERTOP DRIVE

[75] Inventor: Tomeo Umemoto, Osaka, Japan

[73] Assignee: Kubota, Ltd., Osaka, Japan

[21] Appl. No.: 928,561

[22] Filed: Nov. 10, 1986

[30] Foreign Application Priority Data

Mar. 3, 1986 [JP] Japan ................................. 61-47102
Mar. 4, 1986 [JP] Japan ................................. 61-46932

[51] Int. Cl.$^4$ ............................................. B60K 17/00
[52] U.S. Cl. ...................................... 180/70.1; 180/75
[58] Field of Search ............................. 180/70.1, 75.1

[56] References Cited

FOREIGN PATENT DOCUMENTS 2202425 5/1982 Fed. Rep. of Germany ..... 180/75.1

Primary Examiner—Kenneth R. Rice
Attorney, Agent, or Firm—Gifford, Groh, VanOphem, Sheridan, Sprinkle and Dolgorukov

[57] ABSTRACT

A transmission system for a vehicle comprising a main transmission, a bypass transmission line, an auxiliary transmission, and a rear wheel drive line. The main transmission includes a multistep change speed mechanism, a first output gear for outputting a maximum speed provided by the multistep change speed mechanism, and a second output gear for outputting other speeds provided by the multistep change speed mechanism. The bypass transmission line is operatively connected to the first output gear, and the auxiliary transmission is operatively connected to the second output gear. The rear wheel drive line is operatively connected to the bypass transmission line and to the auxiliary transmission. The first output gear, bypass transmission line and front wheel drive line constitute an overtop drive transmission line.

10 Claims, 5 Drawing Sheets

TRANSMISSION FOR WORKING VEHICLE HAVING OVERTOP DRIVE

BACKGROUND OF THE INVENTION (1) Field of the Invention

The present invention relates to a transmission system for a working vehicle, particularly an agricultural tractor, in which drive of an engine is transmitted to a wheel drive mechanism after being subjected to a speed change at a main transmission and an auxiliary transmission.

(2) Description of the Prior Art

In known transmission systems as noted above, the drive output by the main transmission, regardless of its speed, is transmitted to the wheel drive mechanism through the auxiliary transmission.

Where, for example, an operation in one site is completed and the vehicle should be moved to a next site of operation, it is desirable to drive the vehicle at a maximum forward speed (hereinafter referred to as overtop speed) by shifting the main transmission to a high speed position. With the known transmission system, however, the shifting of the main transmission to the high speed position does not produce the overtop speed if the auxiliary transmission is in a low speed position. In order to obtain the overtop speed it is necessary to shift the auxiliary transmission to a high speed position also. Thus it has been a troublesome operation to change the drive to the overtop speed.

SUMMARY OF THE INVENTION

The object of the present invention is to provide a transmission system capable of producing the overtop speed only by shifting the main transmission even when the auxiliary transmission remains in the low speed position, and to simplify transmission lines operatively connecting the main transmission to drive wheels.

The foregoing object is accomplished in one embodiment by providing a transmission system for a vehicle comprising a main transmission including a first transmission shaft for receiving power of an engine, multistep change speed means, a first output means for outputting a maximum speed provided by the multistep change speed means in a high speed position, and a second output means for outputting a speed provided by the multistep change speed means in at least one position other than the high speed position, bypass transmission means operatively connected to the first output means, an auxiliary transmission operatively connected to the second output means, and rear wheel drive means operatively connected to the bypass transmission means and to the auxiliary transmission and including a rear differential and rear wheels, wherein the first output means, bypass transmission means and rear wheel drive means constitutes a drive transmission line utilized as overtop drive transmission line.

According to the above construction, when the main transmission is shifted to a position other than the overtop speed position, the resulting drive is transmitted to the rear wheel drive means through the auxiliary transmission. When the main transmission is shifted to the overtop speed position, the drive is transmitted directly to the real wheel drive means bypassing the auxiliary transmission. Therefore, the vehicle is driven at the overtop speed only by shifting the main transmission to the overtop speed position regardless of the position of the auxiliary transmission. Thus the present invention provides an improved operational efficiency.

In one preferred embodiment of the invention, the bypass transmission means acts also as front wheel drive line where the vehicle employing the trasmission system of this invention is a four wheel drive vehicle.

According to this embodiment, when the main transmission is shifted to a position other than the overtop speed position, the drive is transmitted to the rear wheel drive line and the front wheel drive line through the auxiliary transmission. When the main transmission is shifted to the overtop speed position, the drive is transmitted directly to the front wheel drive line bypassing the auxiliary transmission. Therefore, the vehicle is driven at the overtop speed only by shifting the main transmission to the overtop speed position regardless of the position of the auxiliary transmission. Thus the present invention provides an improved operational efficiency, and a simplified transmission lines by operatively connecting the front wheel drive line provided as intrinsic part of the working vehicle to the overtop speed output element of the main transmission.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

The present invention will be described further with reference to the accompanying drawings showing a transmission system for an agricultural tractor which is one example of working vehicle.

Figure 1:
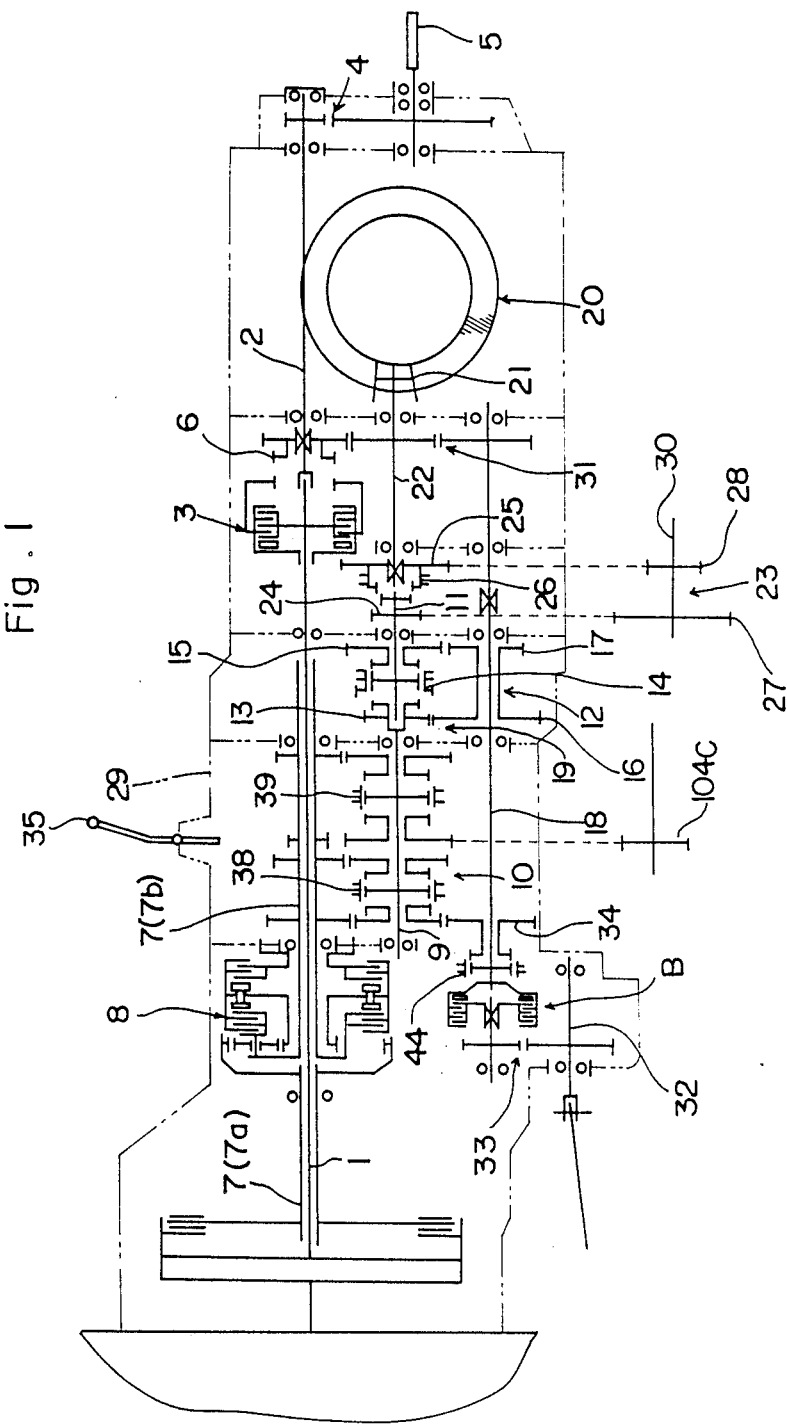
FIG. 1 is a schematic view of a transmission system embodying the present invention.

Referring to FIG. 1, the transmission system comprises a PTO drive line for driving an attached working implement and including a drive transmission shaft 1 for receiving power of an engine, not shown, a driven transmission shaft 2, and a wet type friction clutch 3 between the shafts 1 and 2. The drive is transmitted from the driven transmission shaft 2 through a reduction gearing 4 to a power takeoff shaft 5. The driven transmission shaft 2 is provided with a changeover gear 6 to produce live, neutral and ground states of PTO drive.

The transmission system further comprises a propelling drive line which will be described hereinafter. The propelling drive line includes a first propelling transmission shaft 7 relatively rotatably mounted on the drive transmission shaft 1 at an upstream position thereof. The first propelling transmission shaft 7 comprises an upstream shaft portion 7a and a downstream shaft portion 7b. The two shaft portions 7a and 7b are interposed by a planetary gear type high and low speed switching mechanism 8 including a frictional multidisk hydraulic clutch (which is known as dual change speed mechanism and is operable to reduce the high speed of about 25%). A second propelling transmission shaft 9 is disposed parallel to the downstream shaft portion 7b, and a main transmission 10 including a synchromesh change speed gearing 100 is provided between the downstream shaft portion 7b and the second propelling transmission shaft 9 to provide three forward speeds and one backward speed.

The second propelling transmission shaft 9 acts as means to output speeds of the main transmission 10 other than a maximum forward speed or overtop speed, and is operatively connected to an auxiliary transmission 12. A third propelling transmission shaft 11 is disposed in relatively rotatable abutment with the second propelling transmission shaft 9.

The change speed gearing 100 will particularly be described next with reference to FIG. 2. As shown, the downstream shaft portion 7b of the first propelling transmission shaft 7 carries a first input gear 101a, a second input gear 102a, a third input gear 103a and a fourth input gear 104a, all fixed to the shaft portion 7b. The second propelling transmission shaft 9 carries a first output gear 101b, a second output gear 102b, a third input gear 103b and a fourth output gear 104b, all rotatable relative to the shaft 9. The first input gear 101a is meshed with the first output gear 101b to constitute a first gear pair 101. The second input gear 102a is meshed with the second output gear 102b to constitute a second gear pair 102. The third input gear 103a is meshed with the third output gear 103b to constitute a third gear pair 103. The fourth input gear 104a is in engagement with the fourth output gear 104b through a reversing gear 104c to constitute a reversing gear group 104.

A synchromesh type engaging device 106 is mounted between the first output gear 101b and the second output gear 102b for selectively placing the first output gear 101b and second output gear 102b in operative connection with the second transmission shaft 9. Similarly, a synchromesh type engaging device 107 is mounted between the third output gear 103b and the fourth output gear 104b for selectively placing the third output gear 103b and fourth output gear 104b in operative connection with the second transmission shaft 9.

The first output gear 101b includes a boss portion carrying an intermediate gear 105 fixed thereto which is meshed with an overtop gear 34 to be described later. It is to be noted here that the first gear pair 101 produces a higher speed than the other gear pairs.

The auxiliary transmission 12 comprises a reduction gearing 19 including a relay gear 16 meshed with an output gear 13 fixed to the second propelling transmission shaft 9 and a relay gear 17 meshed with an input gear 15 relatively rotatably mounted on the third propelling transmission shaft 11 by means of a clutch sleeve 14. The relay gears 16, 17 are relatively rotatably mounted on a front wheel drive transmission shaft 18 disposed parallel to the second and third propelling transmission shafts 9, 11. The clutch sleeve 14 is switchable between a high speed position to directly connect the second transmission shaft 9 to the third transmission shaft 11 and a low speed position to transmit output of the second transmission shaft 9 to the third transmission shaft 11 by way of the reduction gearing 19.

A propelling drive output shaft 22 is disposed rearwardly of the third propelling transmission shaft 11, which carries a bevel gear 21 at a rear end thereof for transmitting the drive to a rear differential 20. The third propelling transmission shaft 11 and the propelling drive output shaft 22 are interposed by a super-reduction mechanism 23 for providing two, high and low, speeds. The super-reduction mechanism 23 includes an output gear 24 mounted on the third transmission shaft 11, a clutch sleeve 26 acting as input gear 25 mounted on the output shaft 22, and relay gears 27, 28 meshed with the two gears 24 and 25, respectively and mounted on a shaft 30 supported by a transmission case 29.

Thus, the drive output by the main transmission 10 in the speeds other than the overtop speed is transmitted through the auxiliary transmission 12 and the super-reduction mechanism 23 to the rear wheel drive line and then to the front wheel drive line. The drive output by the main transmission 10 in the overtop speed is transmitted to the front wheel drive line, bypassing the auxiliary transmission 12, and then to the rear wheel drive line. To describe details of the front wheel drive line, output of the propelling drive output shaft 22 constituting part of the rear wheel drive line is transmitted to the front wheel drive transmission shaft 18 through a gearing 31. The drive is then transmitted from the transmission shaft 18 through a reduction mechanism 33 to a front wheel output shaft 32 connected to a front differential not shown, whereby the front wheels are driven in synchronism with the rear wheels.

Figure 2:
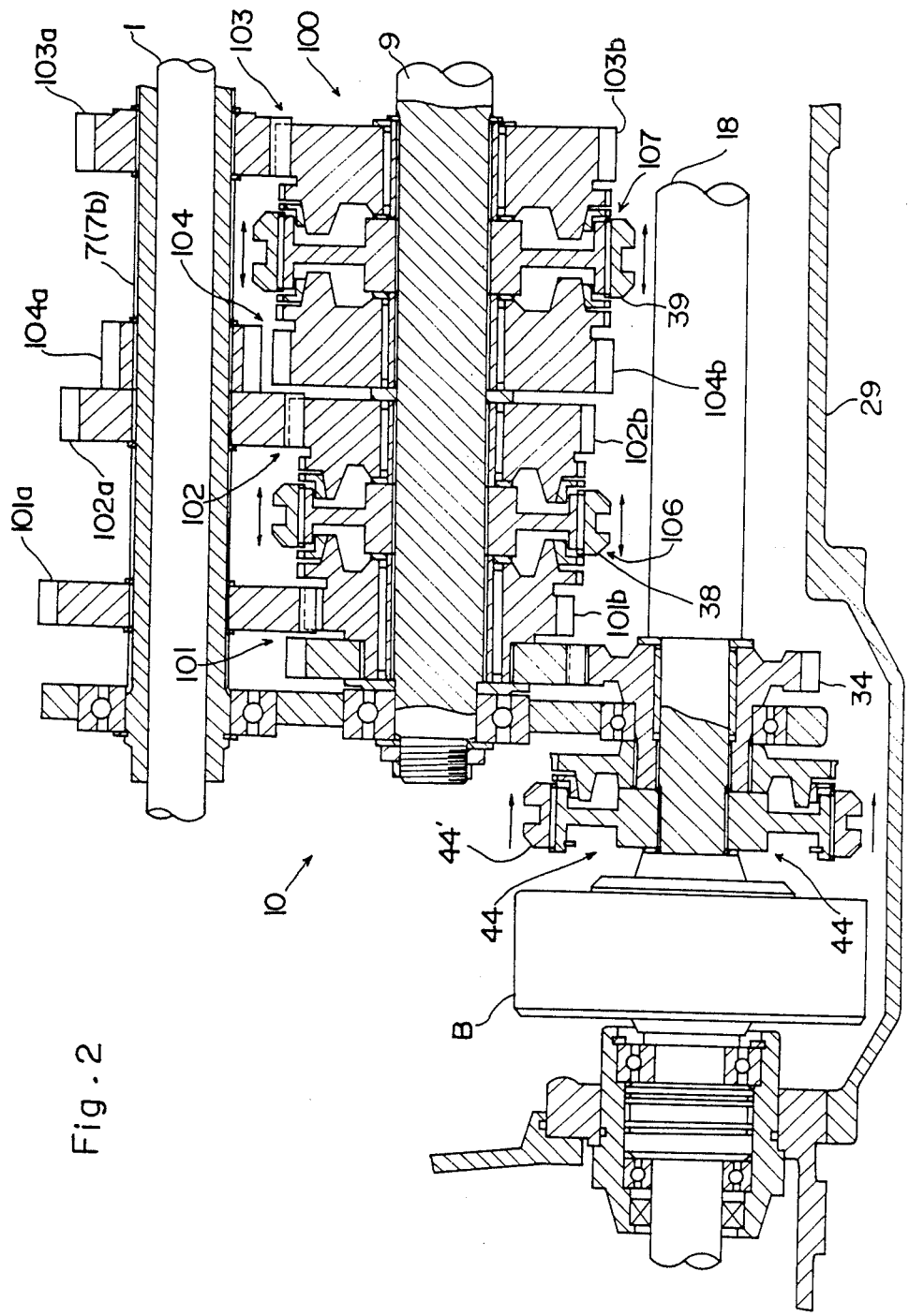
FIG. 2 is a sectional view of a main transmission.

More particularly, as shown in FIG. 2, the front wheel drive transmission shaft 18 carries, relatively rotatably mounted thereon, the overtop gear 34 acting as an overtop speed output element of the main transmission 10. The overtop gear 34 is operatively connectable to the transmission shaft 18 by shifting a shift gear 44' of a synchromesh type engaging device 44 constructed by utilizing a boss portion of the overtop gear 34. Thus, by shifting a main change speed lever 35 to an overtop position, the drive is transmitted from the first propelling transmission shaft 7 to the front wheel drive transmission shaft 18 and then to the front wheel drive output shaft 32 and the propelling drive output shaft 22, bypassing the auxiliary transmission 12. The main transmission 10 is controllable by shifting the main change speed lever 35 back and forth and right and left.

Figure 4:
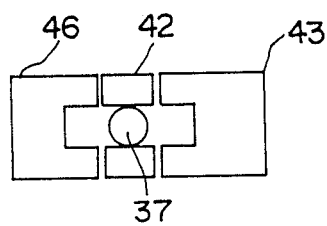
FIG. 4 is a section taken on line IV—IV of FIG. 3.
Figure 5:
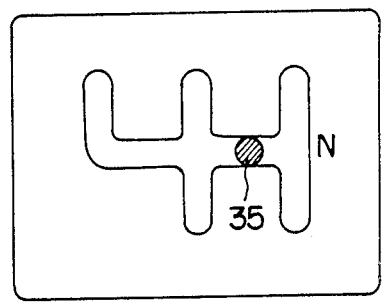
FIG. 5 is a plan view of a shift position indicator.

An interlocking structure between the change speed lever 35 and the main transmission 10 will be described with reference to FIGS. 3 through 5. The change speed lever 35 is connected at a lower end thereof to one end of a rod 36 supported by the transmission case 29 to be movable back and forth. The rod 36 carries an engaging pin 37 at the other end thereof, which is engageable with engagement members 42, 43 and 46. The engagement members 42 and 43 are secured to bosses of shift forks 40 and 41 for operating shift gears 38 and 39 of the engaging devices 106 and 107, respectively, to produce the three forward speeds and one backward speed. The engagement member 46, which has a U-shaped configuration, connected through a link mechanism A to a shift fork 45 for operating the shift gear 44' of engaging device 44 to produce the overtop speed. The three forward speeds, the overtop speed and the backward speed are selectively produced by shifting the change speed lever 35 backward or forward to select one of the shift forks 40, 41 and 45 first and then by shifting the lever 35 rightward or leftward.

The link mechanism A comprises a pin 47 extending into the engagement member 46 and supported by the transmission case 29, and a rod 50 connecting an outer end of the pin 47 to a control rod 49 of a control arm 48 connected to the shift fork 45.

Figure 3:
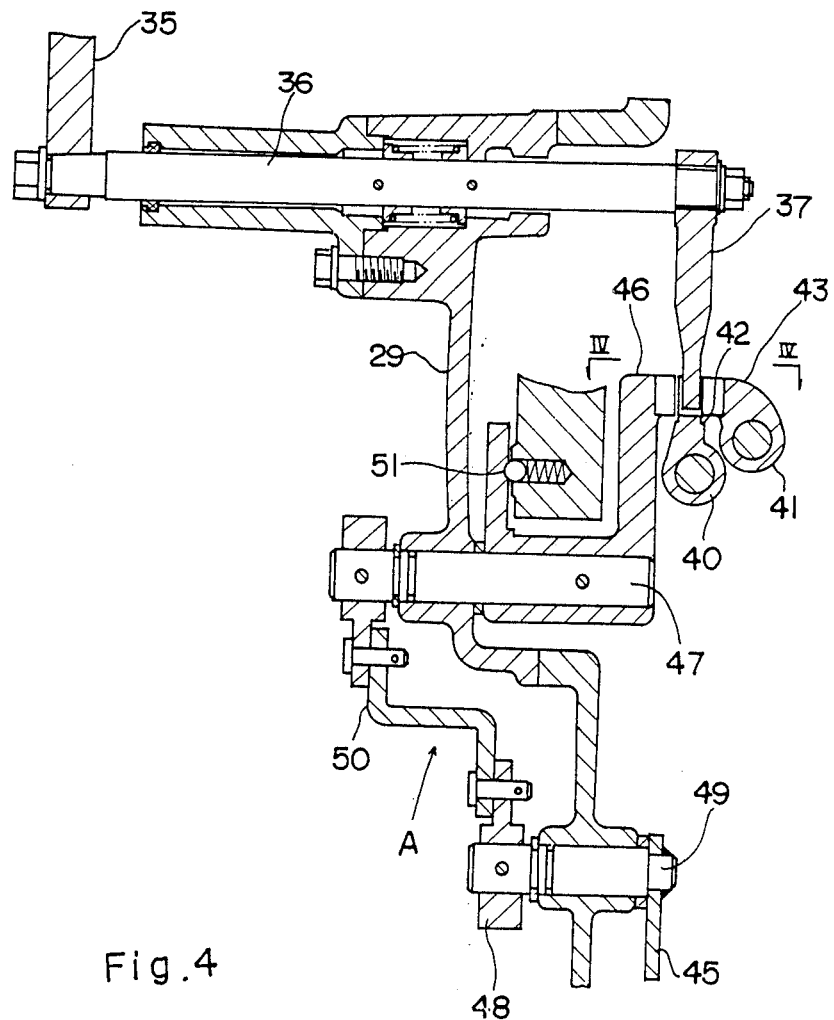
FIG. 3 is a sectional view of a mechanism for controlling the main transmission.

Number 51 in FIG. 3 denotes a ball spring for retaining the change speed lever 35 in an overtop speed position. Reference B in FIG. 1 denotes a clutch for switching the drive mode between a two wheel (rear wheel) drive mode and a four wheel drive mode.

Figure 6:
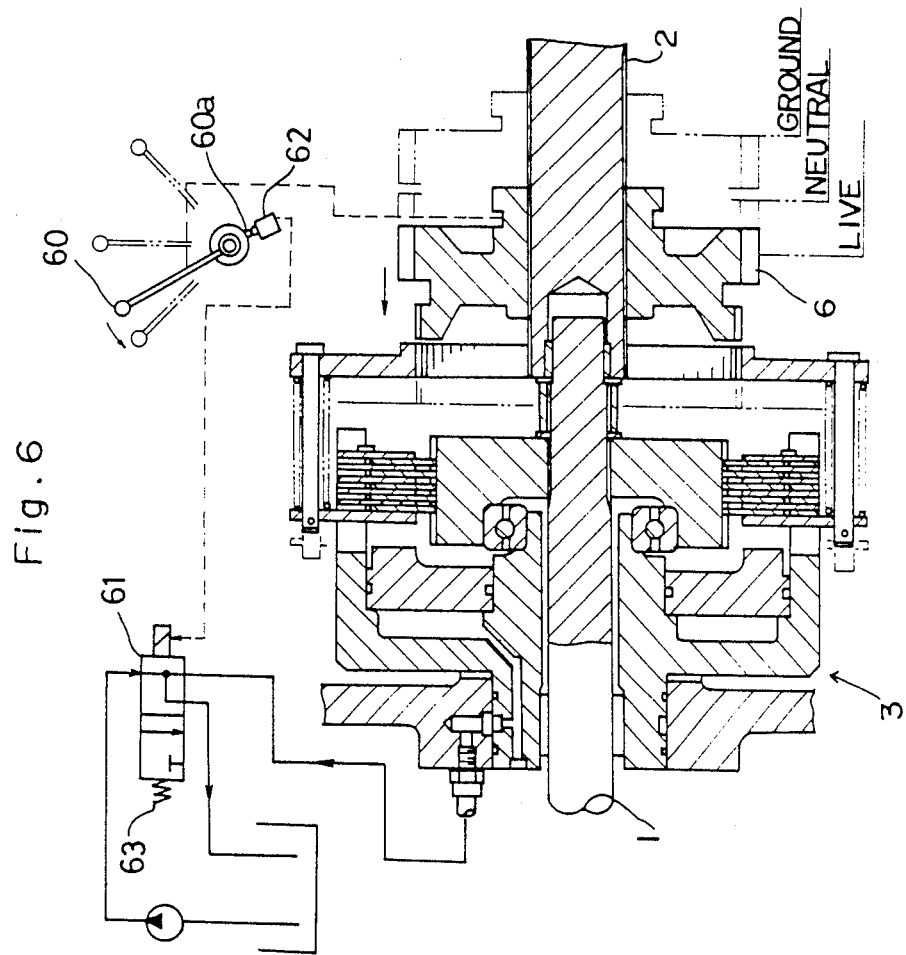
FIG. 6 is a schematic view showing operation of a changeover gear.

The changeover gear 6 mounted on the driven transmission shaft 2 will be described further with reference to FIG. 6. The changeover gear 6 is operable by a control lever 60 having a limit switch 62 at a position therebelow. The limit switch 62 controls an electromagnetic valve 61 for engaging and disengaging the friction clutch 3 only when the changeover gear 6 is switched from a live PTO position to a neutral PTO position and vice versa. More particularly, the control lever 60 defines a projection 60a at a lower end thereof which contacts and turns on the limit switch 62 with an initial shift of the control lever 60 for switching the changeover gear 6 from the neutral PTO position to the live PTO position. This switches the electromagnetic valve 61 to disengage the friction clutch 3. As the control lever 60 is shifted further to place the changeover gear 6 in the live PTO position, the limit switch 62 is turned off whereupon the valve 61 is switched to a drain position by the biasing force of a spring 63 thereby engaging the friction clutch 3. This construction assures gear engagement free of damage to meshing portions of the gears. When switching the changeover gear 6 from the live PTO position to the neutral PTO position, similarly the friction clutch 3 is disengaged first and then the gears are brought out of mesh. This reduces a force of the control lever 60 for operating the changeover gear 6.

Figure 7:
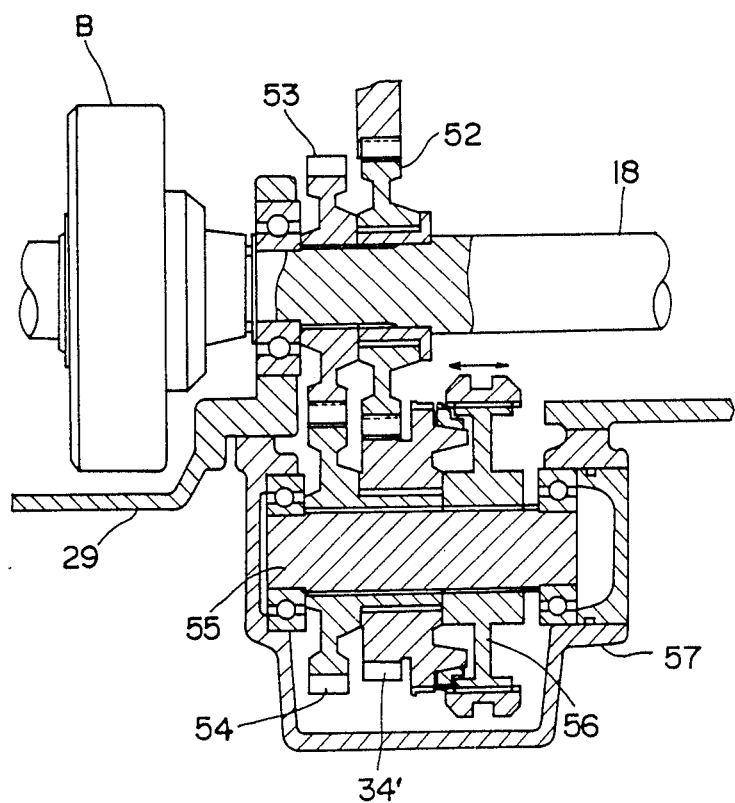
FIG. 7 is a sectional view of a modified overtop gear mounting portion.

In the foregoing embodiment, the overtop gear 34 is combined with the synchromesh type engaging device 44 mounted on the front wheel drive transmission shaft 18, and the combination is contained wholly in the transmission case 29. Alternatively, as shown in FIG. 7, the overtop gear and engaging device may be disposed outside a transmission case defining an opening. In this modified example, the front wheel drive transmission shaft 18 carries, relatively rotatably mounted thereon, an overtop input gear 52 meshed with the intermediate gear 105. The overtop input gear 52 is also meshed with an overtop gear 34' relatively rotatably mounted on an overtop shaft 55 supported by an overtop gear case 57 attached to the transmission case 29. The overtop shaft 55 further carries an engaging device 56 to establish and break operative connection between the overtop gear 34' and the overtop shaft 55.

Furthermore, the overtop shaft 55 carries a first overtop output gear 54 fixed thereto, and the front wheel drive transmission shaft 18 carries a second overtop output gear 53 fixed thereto. By a shift of the engaging device 56, the drive from the first gear pair 101 is transmitted to the front wheel drive transmission shaft 18 through the overtop gear 34'. In this example, the overtop gear 34' is relatively rotatably mounted on a boss portion of the overtop output gear 54 to render the overtop gear case 57 compact.

According to this modification, the entire overtop mechanism is outwardly fitted to the transmission case in the manner known as the cassette type attachment. Therefore, the overtop mechanism is achieved without effecting an extensive modification to existing transmission structures. Where the tractor does not require the overtop mechanism, the overtop gear case 57 may be replaced by a planar cover.

What is claimed is:

1. A transmission system for a vehicle having a pair of rear wheels, a pair of front wheels and an engine having an output shaft, said transmission system comprising:
   a housing;
   a main transmission mounted in said housing including a first transmission shaft selectively engageable with said output shaft of said engine, a second transmission shaft mounted in said housing, said second transmission shaft spaced apart from and parallel with said first transmission shaft, a plurality of gear pairs including a plurality of input gears fixedly mounted to said first transmission shaft in meshing engagement with a plurality of output gears freely rotatably mounted on said second transmission shaft, one of said plurality of output gears being a maximum speed gear, means for selectively interconnecting one of said plurality of output gears with said second shaft;
   an auxiliary transmission having a plurality of gear pairs, said auxiliary transmission interconnected with said second transmission shaft, means for selectively engaging one said plurality of gear pairs of said auxiliary transmission to produce an output;
   a bypass transmission including a bypass shaft rotatably mounted to said housing, said bypass shaft mounted parallel to and spaced apart from said first and second transmission shafts, and overtop gear freely rotatably mounted to said bypass shaft for meshing engagement with said maximum speed gear of said main transmission, a clutch for interconnecting said overtop gear with said bypass shaft to produce a rotational output;
   means for driving said rear wheels in response to said rotational output from said bypass transmission and said auxiliary transmission; and
   means for activating one of said means for interconnecting one of output gears of said main transmission and said clutch of said bypass transmission, said means for activating operable to activate only one of said plurality of output gears and said overtop gear at a time, said means for activating operable to activate said bypass transmission and said pair of rear wheels without engaging said auxiliary transmission to produce an overtop speed.

2. The transmission system as claimed in claim 1, wherein said clutch of said bypass transmission is mounted on said bypass shaft for selectively engaging said overdrive gear to drive said bypass shaft.

3. The transmission system of claim 1 wherein said means for selectively interconnecting one of said plurality of drive gears further comprises at least one clutch mounted on said second transmission shaft.

4. The transmission system as claimed in claim 1 wherein said maximum speed gear further comprises a boss for engagement with said overtop gear of said main transmission.

5. The transmission system as claimed in claim 1 further comprising a power takeoff interconnected with said first transmission shaft.

6. The transmission system as claimed in claim 1 further comprising:
   means for driving said pair of front wheels, said means for driving said front wheels selectively interconnected to said bypass shaft, and means for transferring said output of said auxiliary transmission to said bypass shaft when one of said plurality of output gears is in engagement with said second shaft.

7. The transmission system of claim 1 wherein said means for driving said rear wheels comprises a drive shaft selectively interconnected to said auxiliary transmission and a drive gear fixedly mounted to said drive shaft.

8. The transmission system of claim 7 wherein said bypass transmission comprises a bypass gear fixedly mounted to said bypass shaft and in meshing engagement with said drive gear of said means for driving.

9. The transmission system of claim 1 where one said plurality of gear pairs is interconnected to a reverse gear mounted on an independent shaft for reversing the direction of said second shaft.

10. The transmission system of claim 1 wherein said auxiliary transmission comprises a third propelling drive shaft.

* * * * *